United States Patent
Yu et al.

(10) Patent No.: US 12,509,630 B2
(45) Date of Patent: Dec. 30, 2025

(54) METHOD FOR PRODUCING A CERAMIC CONVERTER ELEMENT, CERAMIC CONVERTER ELEMENT, AND OPTOELECTRONIC COMPONENT

(71) Applicant: OSRAM Opto Semiconductors GmbH, Regensburg (DE)

(72) Inventors: Zhengbo Yu, Shrewsbury, MA (US); Madis Raukas, Lexington, MA (US); John F. Kelso, Exeter, NH (US)

(73) Assignee: OSRAM Opto Semiconductors GmbH, Regensburg (DE)

( * ) Notice: Subject to any disclaimer, the term of this patent is extended or adjusted under 35 U.S.C. 154(b) by 312 days.

(21) Appl. No.: 16/198,108

(22) Filed: Nov. 21, 2018

(65) Prior Publication Data
US 2020/0161506 A1    May 21, 2020

(51) Int. Cl.
*C09K 11/77* (2006.01)
*C04B 33/02* (2006.01)
(Continued)

(52) U.S. Cl.
CPC ........ *C09K 11/7774* (2013.01); *C04B 33/025* (2013.01); *C04B 35/6261* (2013.01);
(Continued)

(58) Field of Classification Search
CPC . C09K 11/7774; C09K 11/77; C09K 11/7715; C04B 35/44; C04B 35/6261; C04B 35/64; C04B 35/65; C04B 35/6264; C04B 35/62635; C04B 33/025; C04B 2235/606; C04B 2235/3225; C04B 2235/3222; C04B 2235/3217; C04B 2235/5436; C04B 2235/5445;
(Continued)

(56) References Cited

U.S. PATENT DOCUMENTS 4,874,985 A * 10/1989 Hase .................... C09K 11/623
                                                         313/487
5,744,411 A *  4/1998 Zhao .................... C04B 35/581
                                                         156/89.27
(Continued)

FOREIGN PATENT DOCUMENTS

CN      101144017 A  *  3/2008
CN      101312911 A  * 11/2008 ............. B82Y 30/00
(Continued)

OTHER PUBLICATIONS

Method of Particle-size Evaluation of Ground Material—THINKY. (Year: 2018).*
(Continued)

*Primary Examiner* — Sophia T Nguyen
(74) *Attorney, Agent, or Firm* — Slater Matsil, LLP

(57) ABSTRACT

A method for producing a ceramic converter element is provided. The method includes providing a phosphor as a starting material, mixing the phosphor and at least one metal oxide powder to form a mixture, and processing the mixture to form a ceramic converter material in which the phosphor is embedded in a ceramic matrix. Further, an optoelectronic component with a ceramic converter element and a ceramic converter element are provided.

18 Claims, 13 Drawing Sheets

(51) Int. Cl.
    *C04B 35/626*           (2006.01)
    *H10H 20/01*            (2025.01)
    *H10H 20/851*          (2025.01)

(52) U.S. Cl.
    CPC .... *C04B 35/62635* (2013.01); *C04B 35/6264* (2013.01); *H10H 20/8512* (2025.01); *H10H 20/8514* (2025.01); *C04B 2235/3217* (2013.01); *C04B 2235/3222* (2013.01); *C04B 2235/3225* (2013.01); *C04B 2235/6025* (2013.01); *C04B 2235/606* (2013.01); *C04B 2235/608* (2013.01); *H10H 20/0361* (2025.01)

(58) Field of Classification Search
    CPC ...... C04B 2235/608; C04B 2235/5296; H01L 33/502; H01L 33/505
    See application file for complete search history.

(56) References Cited

U.S. PATENT DOCUMENTS

| | | | | |
|---|---|---|---|---|
| 6,066,861 | A * | 5/2000 | Hohn | C09K 11/7718 252/301.36 |
| 6,351,069 | B1 * | 2/2002 | Lowery | H01L 33/504 313/503 |
| 7,431,864 | B2 * | 10/2008 | Hirosaki | C09K 11/646 252/301.4 R |
| 7,531,108 | B2 * | 5/2009 | Hampden-Smith | B01J 2/003 102/201 |
| 7,879,258 | B2 | 2/2011 | De Graaf et al. | |
| 7,902,564 | B2 * | 3/2011 | Mueller-Mach | C04B 35/44 252/301.36 |
| 8,142,685 | B2 * | 3/2012 | Hirosaki | C09K 11/7774 252/301.4 R |
| 8,283,843 | B2 * | 10/2012 | Pan | B32B 18/00 313/112 |
| 8,672,523 | B2 * | 3/2014 | Hikmet | C09K 11/7774 362/509 |
| 8,686,626 | B2 * | 4/2014 | Won | C09K 11/7731 313/503 |
| 8,728,835 | B2 * | 5/2014 | Boerkekamp | H01L 33/501 438/29 |
| 8,816,371 | B2 * | 8/2014 | Watkins | H01L 33/502 257/E33.061 |
| 8,940,390 | B2 | 1/2015 | Irie et al. | |
| 9,133,392 | B2 * | 9/2015 | Raukas | C09K 11/7774 |
| 9,499,740 | B2 * | 11/2016 | Miyagawa | C04B 35/44 |
| 9,920,245 | B2 | 3/2018 | Berner et al. | |
| 10,004,146 | B1 | 6/2018 | Wakamatsu | H05K 3/303 |
| 10,836,961 | B2 * | 11/2020 | Watanabe | C30B 29/28 |
| 11,220,632 | B2 | 1/2022 | Sunagawa et al. | |
| 2002/0105269 | A1 * | 8/2002 | Ellens | H01L 33/502 313/512 |
| 2004/0109808 | A1 * | 6/2004 | Lee | C04B 35/6265 501/154 |
| 2004/0124429 | A1 * | 7/2004 | Stokes | H01L 33/508 257/E33.059 |
| 2004/0145308 | A1 * | 7/2004 | Rossner | C04B 35/44 313/512 |
| 2004/0155225 | A1 * | 8/2004 | Yamada | C04B 35/597 252/301.4 R |
| 2005/0117085 | A1 * | 6/2005 | Taira | H01S 3/0602 349/56 |
| 2005/0133808 | A1 * | 6/2005 | Uraya | H01L 33/486 257/E33.072 |
| 2005/0239629 | A1 * | 10/2005 | Yeckley | C04B 35/645 501/95.3 |
| 2005/0269582 | A1 * | 12/2005 | Mueller | C04B 35/44 257/94 |
| 2005/0276995 | A1 * | 12/2005 | Kondo | C09K 11/7774 428/690 |
| 2005/0281302 | A1 * | 12/2005 | Lee | C04B 35/44 372/41 |
| 2006/0030474 | A1 * | 2/2006 | Yeckley | C04B 35/806 501/95.3 |
| 2006/0189474 | A1 * | 8/2006 | Yeckley | C04B 35/6303 501/87 |
| 2006/0202105 | A1 * | 9/2006 | Krames | C04B 37/006 250/208.1 |
| 2007/0091950 | A1 * | 4/2007 | Takata | C01F 17/34 372/39 |
| 2007/0107569 | A1 * | 5/2007 | Yeckley | B82Y 30/00 82/1.11 |
| 2007/0221865 | A1 * | 9/2007 | Sohn | C09K 11/7731 250/484.4 |
| 2007/0221866 | A1 * | 9/2007 | Sohn | C09K 11/7731 250/484.4 |
| 2007/0228390 | A1 * | 10/2007 | Hattori | H01L 33/505 257/79 |
| 2008/0138268 | A1 * | 6/2008 | Tao | C09K 11/777 423/263 |
| 2008/0149956 | A1 * | 6/2008 | Mueller-Mach | C04B 35/597 257/E33.061 |
| 2009/0066221 | A1 * | 3/2009 | Schmidt | C09K 11/7774 313/503 |
| 2009/0153027 | A1 * | 6/2009 | Naum | H01L 33/502 313/503 |
| 2009/0179212 | A1 * | 7/2009 | Naum | C09K 11/7774 257/98 |
| 2009/0184624 | A1 * | 7/2009 | Schmidt | C04B 37/001 313/498 |
| 2010/0032623 | A1 * | 2/2010 | Lange | C09K 11/7774 252/301.4 H |
| 2010/0102464 | A1 * | 4/2010 | Hollingsworth | B82Y 30/00 264/1.22 |
| 2010/0127286 | A1 * | 5/2010 | Schmidt | C04B 35/597 257/E33.061 |
| 2010/0181585 | A1 * | 7/2010 | Juestel | C04B 35/44 257/98 |
| 2010/0264809 | A1 * | 10/2010 | Winkler | C09K 11/025 313/483 |
| 2011/0006668 | A1 * | 1/2011 | Hussell | H01L 33/501 313/499 |
| 2011/0021031 | A1 * | 1/2011 | Taylor | H01J 37/32467 438/724 |
| 2011/0034319 | A1 * | 2/2011 | Villalobos | C04B 35/44 501/152 |
| 2011/0037380 | A1 * | 2/2011 | Li | C09K 11/7734 313/503 |
| 2011/0084293 | A1 * | 4/2011 | Mueller-Mach | C04B 35/597 257/89 |
| 2011/0195838 | A1 * | 8/2011 | Brady | B28B 11/243 502/439 |
| 2011/0210658 | A1 * | 9/2011 | Pan | C04B 35/63488 252/301.4 R |
| 2011/0227477 | A1 * | 9/2011 | Zhang | C04B 35/6342 313/503 |
| 2011/0309384 | A1 * | 12/2011 | Ito | H01L 33/505 257/88 |
| 2011/0309398 | A1 * | 12/2011 | Ito | H01L 33/60 257/98 |
| 2012/0018673 | A1 * | 1/2012 | Raukas | G02B 1/00 252/301.4 R |
| 2012/0045634 | A1 * | 2/2012 | Irie | C04B 35/117 428/220 |
| 2012/0057337 | A1 * | 3/2012 | Liebald | C03C 3/068 362/231 |
| 2012/0068213 | A1 * | 3/2012 | Zhang | H01L 33/505 257/E33.061 |
| 2012/0112130 | A1 * | 5/2012 | Wu | C09K 11/7734 252/301.4 P |
| 2012/0113617 | A1 * | 5/2012 | Kelso | H01L 33/505 252/301.4 R |
| 2012/0141771 | A1 * | 6/2012 | Pan | C04B 35/638 428/312.8 |
| 2012/0218736 | A1 * | 8/2012 | Zhang | C04B 35/50 252/301.4 F |
| 2012/0223236 | A1 * | 9/2012 | Shah | C09K 11/7774 250/362 |

(56) References Cited

U.S. PATENT DOCUMENTS

| | | | |
|---|---|---|---|
| 2012/0235203 A1* | 9/2012 | Mukherjee | B22F 9/26 |
| | | | 977/773 |
| 2012/0326344 A1* | 12/2012 | Kelso | C04B 38/00 |
| | | | 264/21 |
| 2013/0049575 A1* | 2/2013 | Fujita | C04B 37/042 |
| | | | 428/428 |
| 2013/0069007 A1* | 3/2013 | Miyagawa | H05B 33/14 |
| | | | 252/301.4 R |
| 2013/0147342 A1* | 6/2013 | Won | C09K 11/0883 |
| | | | 313/503 |
| 2013/0250544 A1* | 9/2013 | Zink | C09K 11/7774 |
| | | | 362/84 |
| 2013/0309501 A1* | 11/2013 | Ohkuni | B05D 3/0254 |
| | | | 428/408 |
| 2013/0320277 A1* | 12/2013 | Taira | H01S 3/1066 |
| | | | 252/582 |
| 2013/0320384 A1* | 12/2013 | Liepold | F21V 9/00 |
| | | | 257/98 |
| 2013/0320839 A1* | 12/2013 | Watanabe | H05B 33/14 |
| | | | 313/504 |
| 2014/0037969 A1* | 2/2014 | Margolies | C04B 41/009 |
| | | | 428/446 |
| 2014/0203319 A1* | 7/2014 | Peng | H01L 33/505 |
| | | | 257/98 |
| 2014/0287234 A1* | 9/2014 | Okada | C09K 11/7715 |
| | | | 428/402 |
| 2014/0306258 A1* | 10/2014 | Liepold | H01L 33/502 |
| | | | 252/582 |
| 2015/0014711 A1* | 1/2015 | Bergenek | H01L 33/56 |
| | | | 257/88 |
| 2015/0041712 A1* | 2/2015 | Winkler | C04B 35/62807 |
| | | | 252/301.5 |
| 2015/0048392 A1* | 2/2015 | Ahlstedt | H01L 33/504 |
| | | | 257/88 |
| 2015/0055319 A1* | 2/2015 | Zink | F21V 9/08 |
| | | | 362/84 |
| 2015/0083967 A1* | 3/2015 | Watanabe | C30B 15/04 |
| | | | 252/301.4 R |
| 2015/0085497 A1* | 3/2015 | Kelso | H01L 33/502 |
| | | | 313/503 |
| 2015/0144978 A1* | 5/2015 | Miyagawa | B32B 18/00 |
| | | | 252/301.4 F |
| 2015/0298424 A1* | 10/2015 | Menke | C04B 35/44 |
| | | | 428/312.6 |
| 2015/0354783 A1* | 12/2015 | Tsumori | C09K 11/617 |
| | | | 362/84 |
| 2016/0244665 A1* | 8/2016 | Vosgroene | C09K 11/7774 |
| 2016/0268488 A1* | 9/2016 | Goeoetz | H01L 33/505 |
| 2016/0315231 A1* | 10/2016 | Göötz | H01L 33/504 |
| 2016/0334552 A1* | 11/2016 | Lenef | H01L 33/505 |
| 2017/0018689 A1* | 1/2017 | Yu | C09K 11/7734 |
| 2017/0160627 A1* | 6/2017 | Ikesue | G03B 21/16 |
| 2017/0219171 A1* | 8/2017 | Sorg | H05B 33/20 |
| 2018/0044588 A1* | 2/2018 | Watanabe | H01L 33/501 |
| 2018/0053881 A1* | 2/2018 | Murphy | C09K 11/7774 |
| 2018/0062050 A1* | 3/2018 | Bechtel | F21K 9/60 |
| 2018/0194673 A1 | 7/2018 | Liebald et al. | |
| 2018/0216800 A1* | 8/2018 | Yamanaka | C09K 11/02 |
| 2018/0298281 A1* | 10/2018 | Yu | C09K 11/0883 |
| 2018/0306409 A1* | 10/2018 | Hikmet | F21K 9/64 |
| 2018/0313501 A1* | 11/2018 | Anc | C09K 11/703 |
| 2018/0340119 A1* | 11/2018 | Piquette | F21V 7/22 |
| 2018/0351049 A1* | 12/2018 | Mori | C04B 35/62685 |
| 2019/0024863 A1* | 1/2019 | Gammer | F21S 41/37 |
| 2019/0031567 A1* | 1/2019 | Yu | F21V 9/30 |
| 2019/0165220 A1* | 5/2019 | Fukui | C04B 35/44 |
| 2019/0177607 A1* | 6/2019 | Murazaki | C09K 11/77348 |
| 2019/0186711 A1* | 6/2019 | Lenef | F21V 7/30 |
| 2019/0195467 A1* | 6/2019 | Rozenburg | C04B 35/6262 |
| 2019/0264100 A1* | 8/2019 | Cozzan | C09K 11/7774 |
| 2019/0309223 A1* | 10/2019 | Sunagawa | C04B 38/0074 |
| 2019/0345068 A1* | 11/2019 | Bartel | C04B 35/62847 |
| 2019/0363507 A1* | 11/2019 | Li | H01S 5/30 |
| 2020/0025341 A1* | 1/2020 | Murai | H01S 5/02257 |
| 2020/0048547 A1* | 2/2020 | Kundaliya | C04B 35/638 |
| 2020/0161506 A1* | 5/2020 | Yu | C04B 33/025 |
| 2020/0161507 A1* | 5/2020 | Yu | H01L 33/505 |
| 2020/0340096 A1* | 10/2020 | Sakashita | C23C 14/3414 |
| 2020/0340804 A1* | 10/2020 | Santamarina | G01N 15/00 |
| 2020/0377714 A1* | 12/2020 | Michels | C08F 279/04 |
| 2020/0392044 A1* | 12/2020 | Miyaishi | C04B 35/62886 |

FOREIGN PATENT DOCUMENTS

| | | | | | |
|---|---|---|---|---|---|
| CN | 101536193 | A | * | 9/2009 | C09K 11/777 |
| CN | 101569021 | A | | 10/2009 | |
| CN | 102076624 | A | * | 5/2011 | C03C 3/095 |
| CN | 102471139 | A | * | 5/2012 | H01J 11/48 |
| CN | 101766052 | B | * | 7/2012 | C03C 17/36 |
| CN | 103080272 | A | | 5/2013 | |
| CN | 101768444 | B | | 7/2013 | |
| CN | 103228762 | A | | 7/2013 | |
| CN | 103805184 | A | | 5/2014 | |
| CN | 104745190 | A | * | 7/2015 | C09K 11/7769 |
| CN | 104803599 | A | * | 7/2015 | H01L 33/501 |
| CN | 106410016 | A | * | 2/2017 | C03C 4/12 |
| CN | 110342908 | A | | 10/2019 | |
| JP | 2008533270 | A | | 8/2008 | |
| JP | 2012062459 | A | | 3/2012 | |
| JP | 2013533359 | A | | 3/2012 | |
| JP | 2013543525 | A | | 12/2013 | |
| JP | 2015530754 | A | * | 10/2015 | |
| JP | 5874425 | B2 | * | 3/2016 | |
| JP | 2016204563 | A | | 12/2016 | |
| JP | 2019182730 | A | | 10/2019 | |
| KR | 101013146 | B1 | * | 2/2011 | C09K 11/7774 |
| TW | 200901506 | A | | 1/2009 | |
| WO | 2008078285 | A2 | | 7/2008 | |
| WO | 2011097137 | A1 | | 8/2011 | |
| WO | 2015077357 | A1 | | 5/2015 | |

OTHER PUBLICATIONS

Li, Shuxing, et al., "Al2O3-YAG:Ce composite phosphor ceramic: a thermally robust and efficient color converter for solid state laster lighting", Journals of Materials Chemistry C, Aug. 9, 2016, 7 pages.

Segawa, Hiroyo, et al., "Fabrication of silica glass containing yellow oxynitride phosphor by the sol-gel process", Science and Technology of Advanced Materials, vol. 12, May 27, 2011, 6 pages.

Wang, Lianming, et al., "Semi-Quantitative Estimation of Ce3+/Ce4+ Ratio in YAG:Ce3+ Phosphor under Different Sintering Atmosphere", Open Journal of Inorganic Chemistry, 5, 12-18, Jan. 5, 2015, 8 pages.

Nakajima, Satoru, et al., "Fabrication of TiO2—SiO2 glasses containing Ca-alpha-SiAlON:Eu2+ phosphor using the sol-gel process", Journal of the Ceramic Society of Japan, 121 (4), Feb. 4, 2013, pp. 361-365.

* cited by examiner

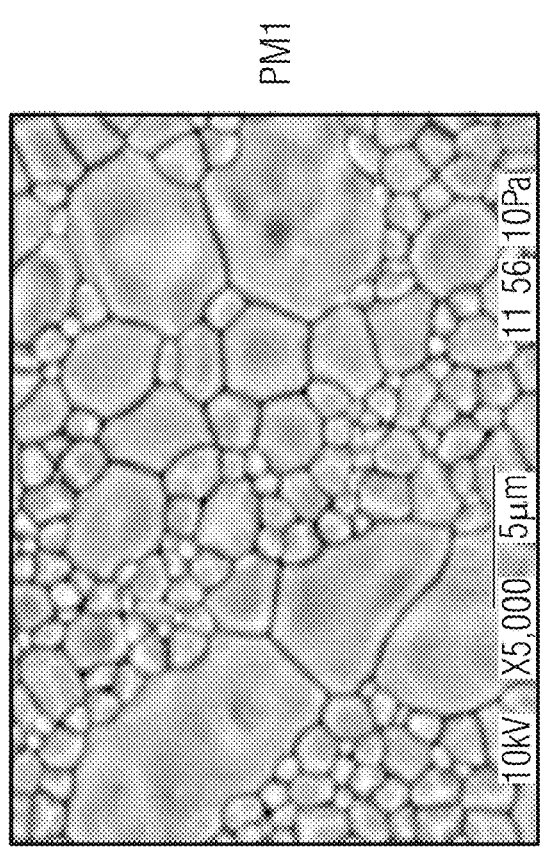
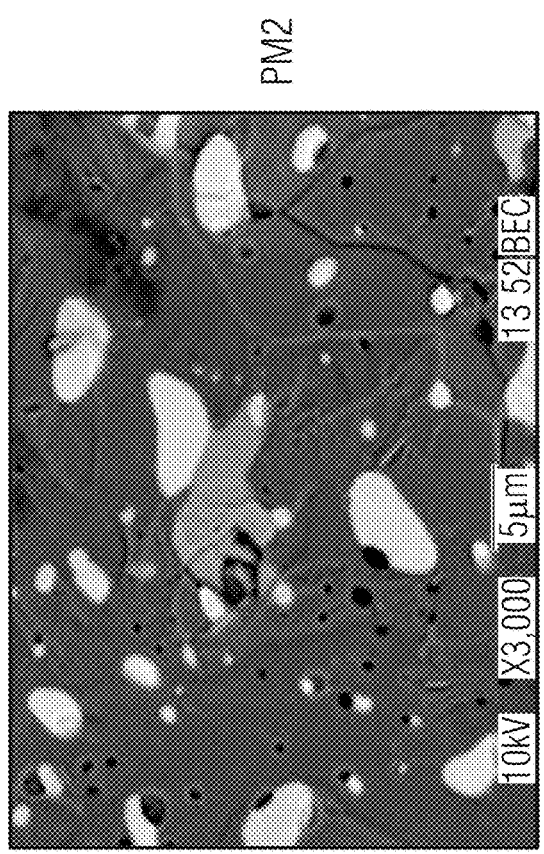
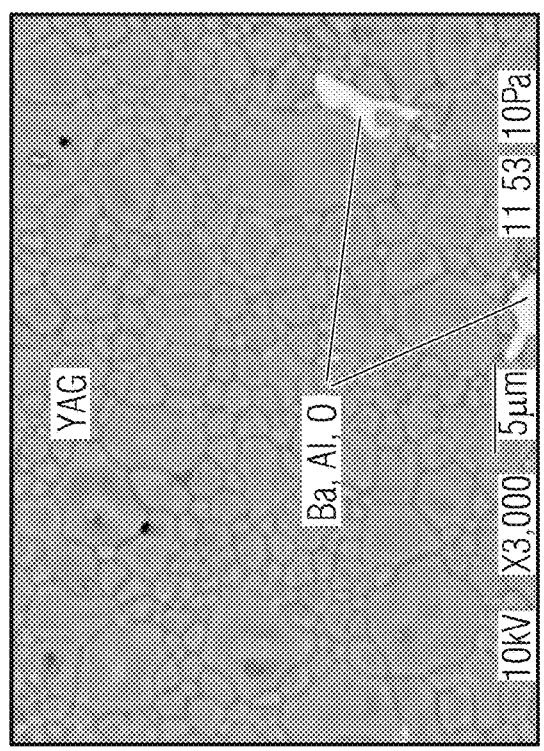
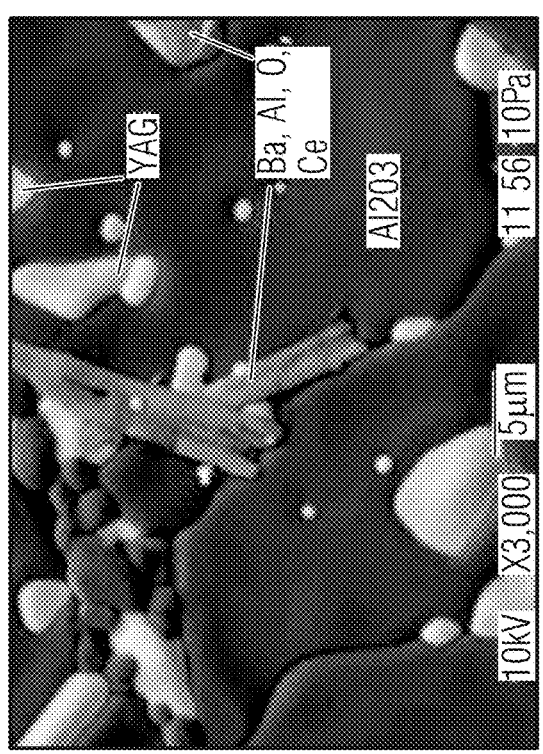
FIG 6a
FIG 6b

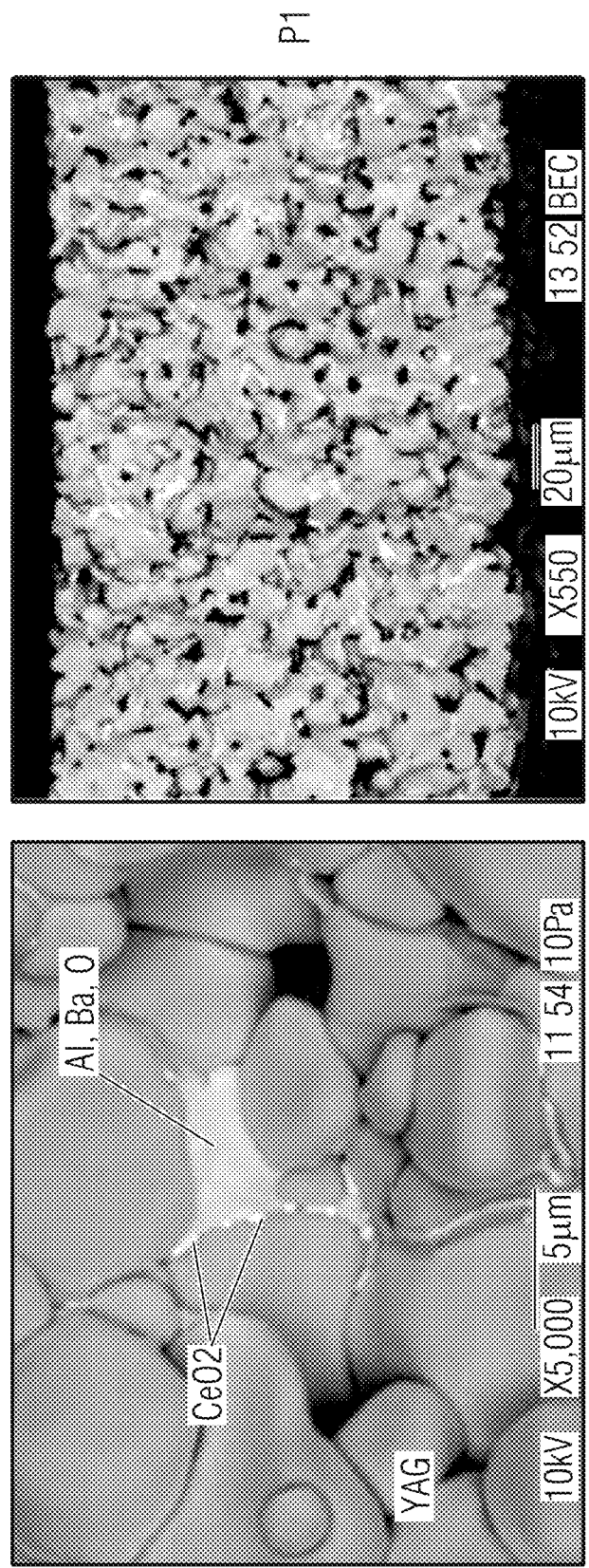

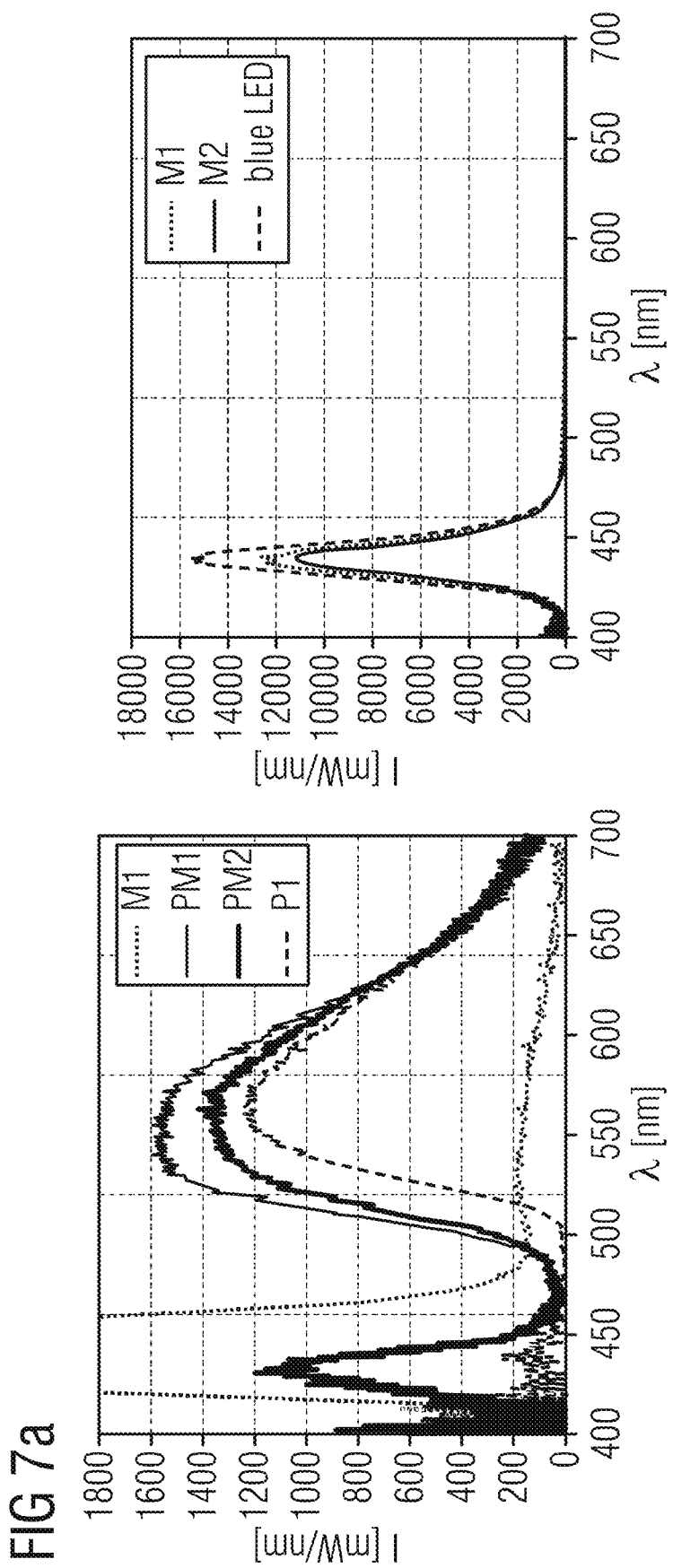

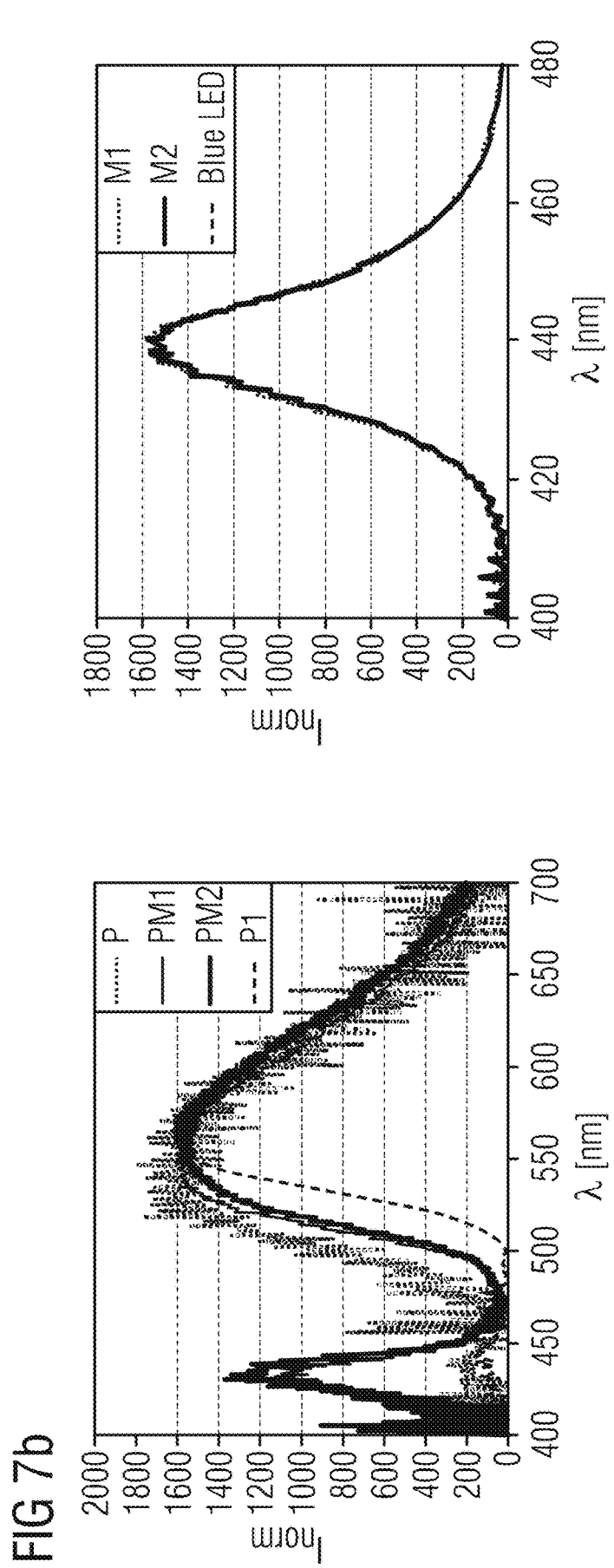

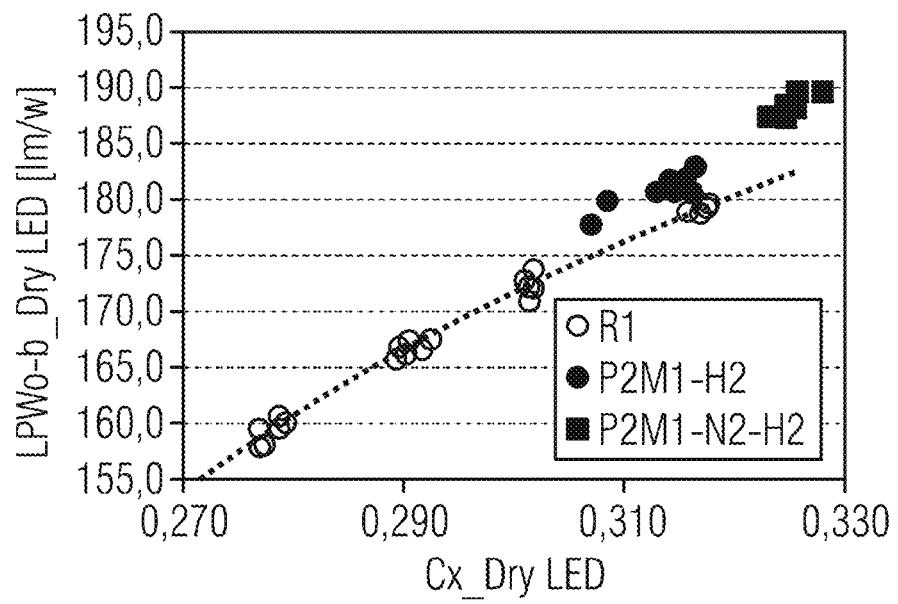
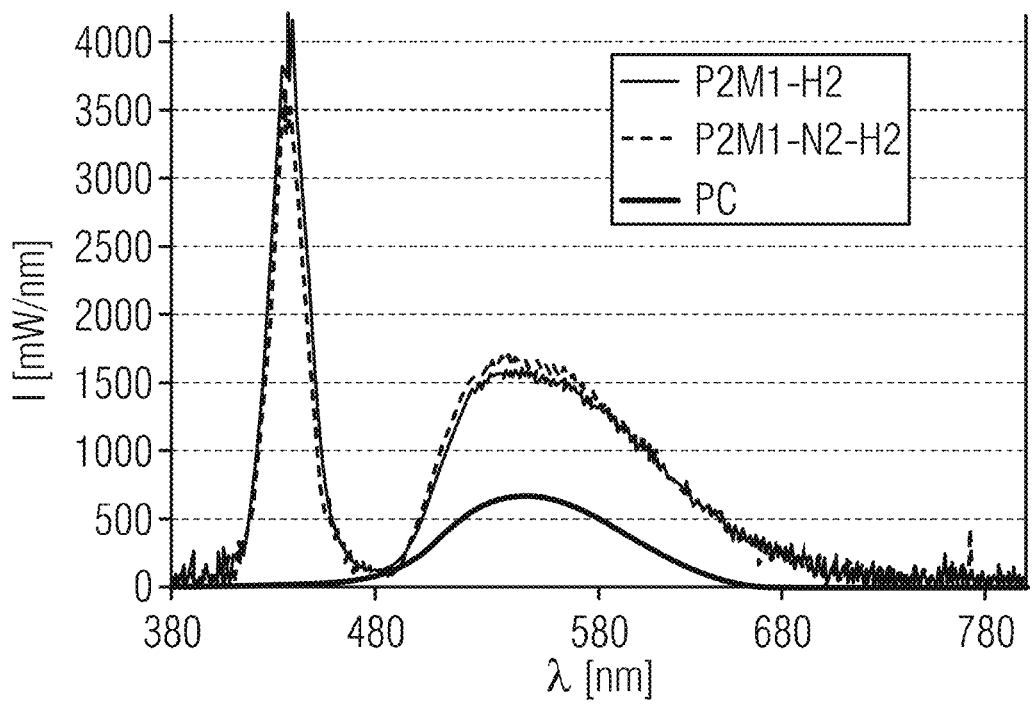

METHOD FOR PRODUCING A CERAMIC CONVERTER ELEMENT, CERAMIC CONVERTER ELEMENT, AND OPTOELECTRONIC COMPONENT

TECHNICAL FIELD

The invention refers to a method for producing a ceramic converter element, a ceramic converter element, and an optoelectronic component.

BACKGROUND

Radiation emitting components like, for example, light-emitting diodes (LED) emit visible or non-visible radiation. Depending on the materials of the LED it emits light of a primary radiation, in case of InGaN, blue light, for example. Such an LED may be combined with a converter layer comprising phosphors which convert the primary radiation at least partially into a secondary radiation of a different wavelength. For example, a blue light emitting LED may be combined with a yellow emitting oxide converter such as YAG:Ce, for example, to produce white light. A lighting device including the LED and the converter layer emits light of the secondary radiation alone or in combination with unconverted primary radiation.

Currently, the ceramic phosphor converter YAG:Ce (Yttrium Aluminum garnet doped with Ce) may be synthesized by different approaches. For example, there is a mixed oxide approach starting with different oxides, e.g. $Y_2O_3$, $Al_2O_3$, $CeO_2$ and $Gd_2O_3$ and being processed by several steps. Typically this approach results in either a coarse or a fine phosphor particle size or grain size of the ceramic that depends on the particle size of the starting oxides and the grain growth during the sintering. The disadvantage of the mixed oxide approach is that sometimes the reactions between the oxides are not complete, resulting in non-stoichiometric YAG:Ce phosphor particles together with other undesirable phases like (Ce- or Gd-containing) YAG ($Y_3Al_5O_{12}$), YAM ($Y_4Al_2O_9$), YAP ($YAlO_3$), $Y_2O_3$ or $Al_2O_3$. This mixture leads to a lower quantum efficiency (QE) of the materials and hence generates a low luminous flux.

Another approach for producing the ceramic phosphor converter YAG:Ce is the co-precipitated phosphor precursor synthesis approach using a wet chemical process for creating the starting mixture in which different organic or inorganic salts containing Y, Al, Ce, Gd and others, react with each other in an aqueous or organic solvent and compounds containing these elements co-precipitate. With this method the resulting phosphors exhibit a fine particle size, however, sometimes unreacted phases like YAM, YAP or others are observed when processing the fine powder. This results in second or third phases of the final ceramic converter leading to a color shift and a low QE.

SUMMARY

One object is to provide an improved method for producing a ceramic converter element. Another object is to provide an improved optoelectronic component comprising a ceramic converter element and a ceramic converter element. These objects are solved with a method and an optoelectronic component and a ceramic converter element according to the independent claims. Further embodiments of the method and of the optoelectronic component are subject of dependent claims, the specification and the exemplary embodiments.

According to one aspect a method for producing a ceramic converter element is provided.

A ceramic converter element is to be understood to be able to convert wavelength of a primary radiation at least partially into wavelength of a secondary radiation. For this purpose it comprises as an active material a phosphor being able to convert the radiation by photoluminescence. It is desirable to have a high QE when radiation is converted. In the following the expressions "ceramic converter element" and "converter element" are interchangeably used.

According to one embodiment a phosphor is provided as a starting material. In other words, the method uses a pre-synthesized phosphor powder with the desired crystal structure that is used as a starting material. Therefore, optical properties and microstructures of the phosphor in the ceramic converter element can be tailored depending on the requirements of the device in which the converter element is to be implemented. For example, the desired particle size of the phosphor can be determined in a way to have a ceramic converter element with a controlled scattering, absorption, pore size, pore density and other microstructure characteristic.

According to another embodiment the phosphor and at least one metal oxide powder is mixed to form a mixture. As the phosphor may also be provided in form of a powder, the mixture is according to one embodiment a powder mixture.

According to another embodiment, the mixture may be processed to form a ceramic converter material in which the phosphor is embedded in a ceramic matrix material. The matrix material is a ceramic matrix, being primarily formed from the metal oxide powder, which comprises certain desired properties and which was added to or mixed with the pre-synthesized phosphor, wherein the phosphor comprises desired or specified properties.

According to one aspect a method for producing a ceramic converter element is provided. The method comprises the steps of: providing a phosphor as a starting material, mixing the phosphor and at least one metal oxide powder to form a mixture, and processing the mixture to form a ceramic converter material in which the phosphor is embedded in a ceramic matrix material.

Such a method is simple to conduct and low in cost. As a pre-synthesized phosphor is used as one of the starting materials the further method can be treated just as a mixed oxide process.

The phosphor which is used as a starting material may be chosen such that it has a very high QE leading to a ceramic converter element also having a high QE and package Conversion Efficiency (CQE), when the converter element is applied in an optoelectronic device. For this purpose a phosphor with a very high QE is chosen as a starting material. Due to the controlled process the phosphor and its QE is not damaged and the high QE and/or high CQE can be maintained and achieved in the final ceramic converter element and in package, at least to a large extent.

For example, a maximum QE observed for ceramic converter elements being produced by a mixed oxide approach or a co-precipitate approach is approximately between 90% and 95%. With a ceramic converter element produced by a method as outlined above, a ceramic converter element having a QE and/or CQE being 2 to 3% higher than the corresponding converters made by conventional processes may be obtained.

According to another embodiment is the phosphor chosen from a group consisting of doped garnets, oxide based phosphors, nitride based phosphors, oxynitride based phosphors and combinations thereof. For example, doped garnets are chosen from with Ce and/or Gd doped YAG or LuAG. Other examples for phosphors are $Eu^{2+}$ doped 258-nitrides or $Eu^{3+}$ doped YAG.

According to another embodiment the phosphor comprises a doped garnet.

A garnet is to be understood to be a crystal structure type of a specified chemical composition containing a selection from a wide variety of chemical elements. In the present case such elements could be, for example, Y, Gd, Al, and O, with Ce as a dopant.

It is understandable to those skilled in art that more than one type of phosphor of varying chemical compositions may be used in the mixture at the same time, producing multiple wavelength bands of converted light for a custom color, for example components like green, yellow, orange and/or red mixed in specific proportions. Different phosphor component materials will have to be used to produce different combinations.

According to another embodiment, the at least one metal oxide powder is chosen from a group consisting of undoped garnets, oxides of rare earth elements, in particular from La to Lu, oxides of transition metals, oxides of alkaline elements, oxides of alkaline earth elements and combinations thereof. For example, the metal oxide powder comprises the undoped garnet or $Al_2O_3$. For example, if YAG is used as a garnet being doped to form the phosphor, the metal oxide may be chosen from undoped YAG and/or $Al_2O_3$, for example.

According to another embodiment, the phosphor and the metal oxide powder are free of second phases and/or impurities. For example, in the case of YAG as a garnet, no undesirable phases like YAM, YAP or $Y_2O_3$ are formed as residual second phase or third phase, such that the QE of the converter element remains high.

According to another embodiment the doped garnet comprises YAG and the metal oxide powder comprises YAG and/or $Al_2O_3$ or wherein the doped garnet comprises LuAG and the metal oxide powder comprises LuAG and/or $Al_2O_3$. With these material combinations ceramic converter elements with high brightness and high QE may be produced.

According to another embodiment the phosphor comprises a dopant being chosen from lanthanides, in particular from Ce and/or Gd. Other lanthanides like Pr, Eu. etc. are possible dopants as well.

According to another embodiment, the phosphor comprises a grain size d50 chosen from the range of 0.5 $\mu m \leq d50 \leq 40$ $\mu m$ and $d90 \leq 45$ $\mu m$. In particular, d50 may be chosen from the range of 1 $\mu m \leq d50 \leq 20$ $\mu m$ and d90 may be chosen from $\leq 25$ $\mu m$. Thus, large grain sizes of the phosphor may be used in this method. Due to the large grain size, for example the crystallinity and chemical composition of the phosphor make it less reactive with the metal oxide and more favorable optical scattering properties of the converter element when applied in a LED package may be achieved than for fine grains.

In contrast, the YAG or LuAG powder being used as a metal oxide or the $Al_2O_3$ powder being used as a metal oxide may have a d50 in the range of 0.1 $\mu m \leq d50 \leq 10$ $\mu m$ and $d90 \leq 15$ $\mu m$, preferably 0.1 $\mu m \leq d50 \leq 5$ $\mu m$ and $d90 \leq 8$ $\mu m$.

All starting materials, that is the doped phosphor and the metal oxides, may be highly active and sinterable. The doping level of the phosphor, for example YAG:Ce, may be in the range of 0.05 at. % to 6 at. %, preferably 0.1 at. % to 4 at. %. The doping level of the metal oxides, for example YAG or $Al_2O_3$ may be in the range of 0.0 at. % to 1 at. %, preferably 0.0 at. % to 0.02%. The YAG powder being used as a matrix may be cubic crystalline with no second phase and a purity of over 99.5%. An $Al_2O_3$ powder being used as a matrix may be a $\alpha$-$Al_2O_3$ crystal with no second phases and a purity of over 99.5%. The pre-synthesized YAG:Ce phosphor may have a cubic crystal phase with no second phases.

According to another embodiment the phosphor comprises a quantum efficiency QE of at least 90%. Preferably the quantum efficiency of the phosphor is >95% or even equal to or greater than 99%.

According to another embodiment the method comprises the step of mixing that in turn may comprise milling. The milling is performed for a length of time being long enough to promote a good green microstructure being well-mixed and comprising well-packed powder particles of desired size range. After milling, the slurry and/or powder particles essentially do not comprise any agglomerates and have the same or similar sizes as the particles of the starting materials, i.e. the phosphor and the metal oxide. Additionally, the milled powder particles comprise a fine and narrow distribution of void sizes between the particles, wherein the void size may be equivalent to or below the level of the grain size.

According to another embodiment the processing comprises adding at least one additive to the mixture to form a slurry, tape casting the slurry to form a green part, for example a green sheet, prefiring and/or debinding and sintering the green part to form the ceramic converter material. The converter material may be formed in any desired shape, for example platelets or coupons.

The at least one additive may be chosen from a group comprising water, binders, de-foamers, dispersants, plasticizers, and mixtures thereof. Preferably water, a binder, a de-foamer, a dispersant and a plasticizer are added to the mixture. Some of these additives are also pore-forming additives and are mixed to the mixture for a period long enough to distribute the additives. For example, the mixing takes place for 6 hours to 72 hours depending on the properties of starting powders.

According to another embodiment the sintering is performed in a wet or dry hydrogen atmosphere or in a dry or wet hydrogen-nitrogen atmosphere.

According to another aspect an optoelectronic component is provided. The component comprises an active layer sequence emitting electromagnetic radiation of a primary wavelength, and a ceramic converter element applied in the beam path of the active layer sequence and converting the primary wavelength at least partly into a secondary wavelength, wherein the ceramic converter element comprises a quantum efficiency of at least 90%, in particular of at least 95% especially at least 99%.

According to an embodiment the optoelectronic component comprises a ceramic converter element being produced with a method according to one of the above-mentioned embodiments. Thus, all features and characteristics disclosed with respect to the method are also valid for the optoelectronic component and vice versa. Due to the ceramic converter element being produced with a method as mentioned above, the optoelectronic component has a high CQE.

According to another embodiment the ceramic converter element comprises a phosphor chosen from Ce and/or Gd-doped YAG, Ce and/or Gd-doped LuAG, and mixtures thereof. According to another embodiment the ceramic converter element comprises Ce and/or Gd-doped YAG embedded in a matrix chosen from YAG and $Al_2O_3$ and combinations thereof, or wherein the ceramic converter element comprises Ce and/or Gd-doped LuAG embedded in a matrix chosen from LuAG and $Al_2O_3$ and combinations thereof. Such a converter element may be a yellow-emitting converter element or green-emitting converter element. The active layer sequence may, for example, comprise InGaN and emit blue light.

Another aspect refers to a ceramic converter element being produced with a method according to one of the above-mentioned embodiments. Thus, all features and characteristics disclosed with respect to the method are also valid for the ceramic converter element and vice versa.

A ceramic converter element properly prepared by the above method may comprise a combination of transmission (like total or in-line transmission) and QE values such that it results in higher CQE values when packaged to a LED. This can be also evidenced by a detailed measurement of its scattering properties (Bidirectional Scattering Distribution Function, BSDF; high integrated total figure of scattering intensity from −90 to 90 degrees relative to the incoming light propagation).

BRIEF DESCRIPTION OF THE DRAWINGS

Further embodiments and examples are described in the following with respect to the figures and exemplary embodiments.

FIG. 2, which includes

FIG. 3, which includes

FIG. 5, which includes

FIG. 6, which includes FIGS. 6a-6e, shows SEM images of sintered materials;

FIG. 7, which includes FIGS. 7a and 7b, shows spectra of sintered materials;

FIG. 8, which includes

FIG. 9 shows LPWo-B values;

FIG. 10 shows spectra of exemplary embodiments of converter elements and reference examples;

FIG. 12, which includes

DETAILED DESCRIPTION OF ILLUSTRATIVE EMBODIMENTS

Figure 1:
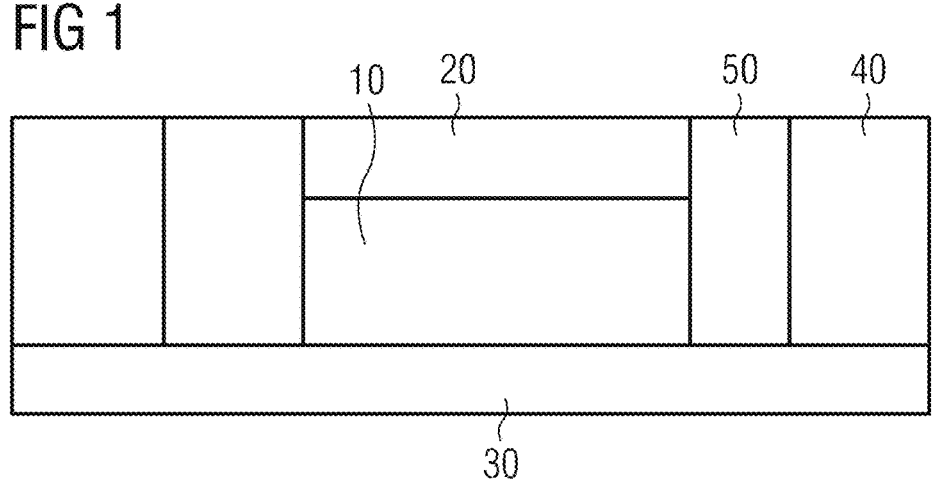
FIG. 1 shows a schematic cross-section of an optoelectronic component.

FIG. 1 shows a schematic cross-section of an optoelectronic component. It comprises substrate 30 on which an active layer sequence 10 is applied. In the beam path of the active layer sequence 10 a ceramic converter element 20 is applied. Active layer sequence 10 and ceramic converter element 20 may be applied in a housing 40, wherein a volume casting 50 may be applied between the housing 40 and the active layer sequence 10. Further elements of the optoelectronic component, like, for example, electrical connections are not shown for the sake of clarity.

The ceramic converter element 20 may comprise, for example, a YAG:(Gd/Ce) phosphor in a YAG matrix, or a $Al_2O_3$ matrix.

The ceramic converter element 20 may be produced as follows.

As starter material a pre-synthesized YAG:Ce phosphor with a cubic crystal phase with no second phases, a Ce doping level of 0.05 at. % to 6 at. %, preferably 0.1 at. % to 4 at. %, a particle size d50 of 0.5 µm to 40 µm, preferably 1 µm to 20 µm, and d90 of 45 µm, preferably 25 µm respectively, which is highly active and sinterable is used. A further starter material is a YAG powder with a cubic crystal phase with no second phase and a purity of >99.5%, a Ce doping level of 0 at. % to 1 at. %, preferably 0 at. % to 0.02 at. %, a particle size d50 of 0.1 µm to 10 µm, preferably 0.1 µm to 5 µm and d90≤15 µm, preferably 8 µm respectively, which is highly active and sinterable. Alternatively, or in addition, an $Al_2O_3$ powder could be used as a matrix having an $\alpha$-$Al_2O_3$ crystal with no second phases and corresponding characteristics as the YAG powder could be used.

Table 1 shows an exemplary batch for tape casting comprising the phosphor $(Y_{0.796}Gd_{0.2}Ce_{0.004})_3Al_5O_{12}$ in a YAG matrix and the additives:

TABLE 1

| Component** | Weight % Solids | Density (g/cm3) | Volume Percent | Volume (cm3) | Weight Percent | Weight (g) |
|---|---|---|---|---|---|---|
| DI Water | 0% | 1.00 | 39.92% | 14.04 | 23.32% | 14 |
| WB4101 | 35% | 1.03 | 39.71% | 13.96 | 23.95% | 14.38 |
| PL005 | 100% | 1.03 | 0.68% | 0.24 | 0.41% | 0.248 |
| DF002 | 100% | 1.20 | 0.15% | 0.05 | 0.11% | 0.064 |
| $Y_{0.796}Gd_{0.2}Ce_{0.004})_3Al_5O_{12}$ | 100% | 4.60 | 1.41% | 0.49 | 3.79% | 2.273 |
| YAG | 100% | 4.56 | 18.13% | 6.38 | 48.42% | 29.07 |

WB4101 is an acrylic binder, DF002 is a non-silicone de-foamer, PL005 is a high pH plasticizer.

When the additives are mixed to the mixture the batch is then cast, dried and cut or punched into the desired size and shape. A desired shape for a sintered ceramic converter element may comprise, for example, a size of 1 mm×1 mm with a thickness of 70 µm to 300 µm. One corner of the converter element may or may not be cut out to provide room for a wire bond to the top surface of an LED chip depending on the chip design. The size can also be as small as 0.5 mm² for smaller LED chips.

The green sheets or parts may be placed on an alumina plate which is then placed in an air atmosphere furnace and heated using a time-temperature cycle of for example: 25° C. to 400° C. for four hours, 400° C. to 1150° C. for four hours, holding at 1150° C. for a period of 0.5 to 2 hours, and cooling to 25° C. within 3 hours.

During such a thermal process the organic carbon-containing species may be removed, including the organic binders being used to hold the powders as well as the pore-forming additive materials, if any, together. The holding temperature of 1150° C. is high enough to allow the powder particles to neck together, giving the parts sufficient strength to be handled. The pore-forming additives may be burnt out, leaving voids that replicate their sizes and shapes, proportionally depending on sintering temperatures.

For example, pre-fired ceramic platelets are transferred onto a molybdenum plate and are sintered, for example in a wet hydrogen atmosphere at 1500 to 1825° C. for a period of 1 minute to 2 hours at the peak temperature. Alternatively a hydrogen-nitrogen atmosphere could be chosen either in dry or wet conditions.

During the hydrogen sintering, the platelets shrink as the ceramic powders sinter and the porosity is removed. If the initial powder particle sizes and the mixing and milling conditions are performed properly and no pore-forming additives are added to the batch, the matrix porosity will be reduced at elevated sintering temperatures to a level that the final converter elements exhibit a high degree of transparency and translucency.

According to example 1 a batch of the YAG:(Gd/Ce) phosphor (P) with a Gd/Ce ratio of 0/100, and a content of Ce of about 2.2 at. % replacing Yin the YAG crystal is introduced into undoped YAG matrix (M1) with a content of about 11.5 vol %. After milling, adding the pore-forming additives if necessary, casting, drying and punching in the desired part size, the parts are heated and after the thermal process sintered at different temperatures from 1680° C. to 1760° C. QE of the thus obtained samples (PM1) was measured using a laser system.

According to example 2, a batch of YAG:(Gd/Ce) phosphor (P) with a Gd/Ce ratio of 0/100, a Ce content of about 2.2 at. % replacing Y in YAG was introduced into undoped $Al_2O_3$ matrix (M2) with a content of about 11.5 vol %. After the process as described above with respect to example 1 and sintered at different temperatures from 1620° C. to 1760° C., the QE values of the thus obtained samples (PM2) were measured.

Whereas PM1 shows a QE of 98% and PM2 shows a QE of 92%, a reference example R2, a single phase YAG:Ce standard converter shows a QE of 91% and reference example R1, a second phase converter—YAG:Ce in $Al_2O_3$ matrix produced by a mixed oxide process, shows a QE of 90%.

According to example 3 a YAG:(Gd/Ce) phosphor (P2) with a Gd/Ce ratio of 0/100 and a Ce content of about 3 at. % replacing Y in YAG is introduced into an undoped YAG matrix (M1) with a content of about 70.2 vol %. Following the process as described above but pre-milling the phosphor and sintering at different temperatures from 1620° C. to 1760° C. in wet forming gas N2-H2 (about 3.6 vol %) CQE of the thus obtained samples P2M1-N2-H2 were measured in Oslon Black Flat (OBF) package in integrating sphere. The typical CQE data are listed in Table 2. For comparison a standard product using phosphor powder made by co-precipitated processes is also included in Table 2 as Reference Example at similar Cx values. The Reference Example is a single phase YAG:Ce standard converter with 15 at. % Gd and 0.2 at. % Ce doped YAG.

According to example 4 a batch of YAG:(Gd/Ce) phosphor (P2) with a Gd/Ce ratio of 0/100, and a content of Ce of about 3 at. % replacing Yin YAG was introduced into undoped YAG matrix (M1) with a content of 7.2 vol %. Following the process as described above but pre-milling the phosphor and sintering at different temperatures from 1620° C. to 1760° C. in wet H2, CQE values of the thus obtained samples P2M1-H2 were measured using an OBF package in sphere. The typical CQE data are listed in Table 2. Further listed in Table 2 are the values of Lm/Wo-b being calculated using the lumens (Lm) from the emission spectra divided by the blue chip optical power (Wo-b) and LER which is calculated using lumens (Lm) integrated from the emission spectra divided by its emission spectra power integrated (Wvis).

TABLE 2

| Sample | CQE (%) | LER (Lm/Wvis) | Lm/Wo-b |
| --- | --- | --- | --- |
| P2M1-N2-H2 | 63.1% | 301.5 | 185.3 |
| P2M1-N2-H2 | 63.6% | 303.8 | 186.9 |
| P2M1-N2-H2 | 63.1% | 305 | 187.3 |
| P2M1-N2-H2 | 64.8% | 295.5 | 185.8 |
| P2M1-N2-H2 | 64.3% | 293.5 | 184.6 |
| P2M1-N2-H2 | 62.8% | 304.5 | 186.2 |
| P2M1-N2-H2 | 63.6% | 303.8 | 187.7 |
| P2M1-N2-H2 | 63.3% | 305.8 | 187.8 |
| P2M1-H2 | 62.7% | 271.7 | 173.8 |
| P2M1-H2 | 62.4% | 280.3 | 176.1 |
| P2M1-H2 | 62.9% | 275.1 | 175.4 |
| P2M1-H2 | 63.0% | 276 | 175.8 |
| P2M1-H2 | 63.2% | 281.4 | 178.2 |
| P2M1-H2 | 62.9% | 282.5 | 178.4 |
| P2M1-H2 | 63.2% | 283.7 | 179.3 |
| P2M1-H2 | 63.7% | 279.5 | 178.3 |
| Reference Example 2 | 62.4% | 263.7 | 165.6 |
| Reference Example 2 | 61.9% | 267.7 | 166.7 |
| Reference Example 2 | 62.6% | 268.3 | 167.9 |
| Reference Example 2 | 62.8% | 267.1 | 168.0 |
| Reference Example 2 | 62.6% | 266.5 | 167.3 |
| Reference Example 2 | 63.0% | 264.8 | 167.2 |
| Reference Example 2 | 62.2% | 269.1 | 167.7 |
| Reference Example 2 | 62.1% | 266.2 | 167.0 |

In the following P designates a YAG:Ce powder with a content of Ce of about 3 at. % and a grain size d50 of about 17 μm. This phosphor has large grains, is well-crystallized and pre-synthesized for having a high QE. P1 designates the phosphor being cast and sintered. PM1 designates the phosphor in a YAG matrix, the phosphor having a content of 11.5 vol %. PM2 designates the phosphor in an $Al_2O_3$ matrix with a phosphor having a content of 11.5 vol %. M1 designates the matrix YAG being cast and sintered. M2 designates the matrix $Al_2O_3$ being cast and sintered. Further, P2M1-H2 designates a YAG:Ce phosphor with a content of Ce of about 3 at. % and a d50 of about 7 μm in a YAG matrix, the phosphor having a content of 7.2 vol % and being sintered in a wet hydrogen atmosphere. Accordingly, P2M1-N2-H2 designates a YAG:Ce phosphor with a content of Ce of about 3 at. % and a d50 of about 7 μm in a YAG matrix, the phosphor having a content of 7.2 vol % and being sintered in a wet hydrogen nitrogen atmosphere.

Figure 2A:
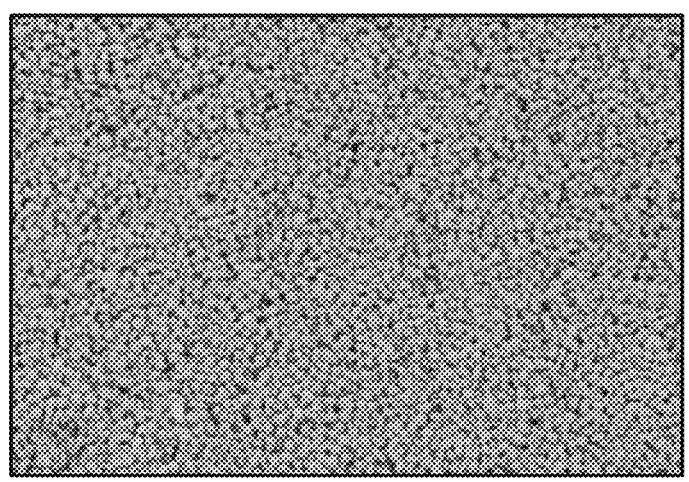
FIGS. 2a and 2b, shows SEM images of phosphors used in the method according to an exemplary embodiment.
Figure 2B:
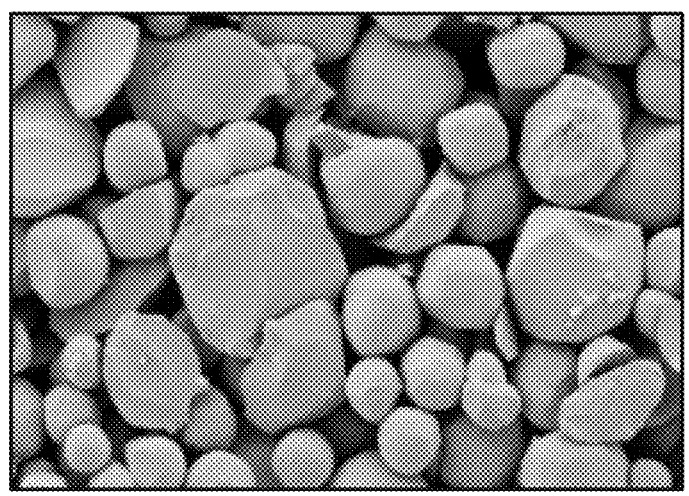

FIG. 2 shows SEM images of the phosphor P being not surface treated and having a QE of about 99% and a d50 of about 17 μm. The color point of this phosphor is suitable, for example, for headlamp color boxes. The particle diameter d50 is not ideal for ceramic processing in the present matrix method. FIG. 2b is an amplification of FIG. 2a.

Figure 3B:
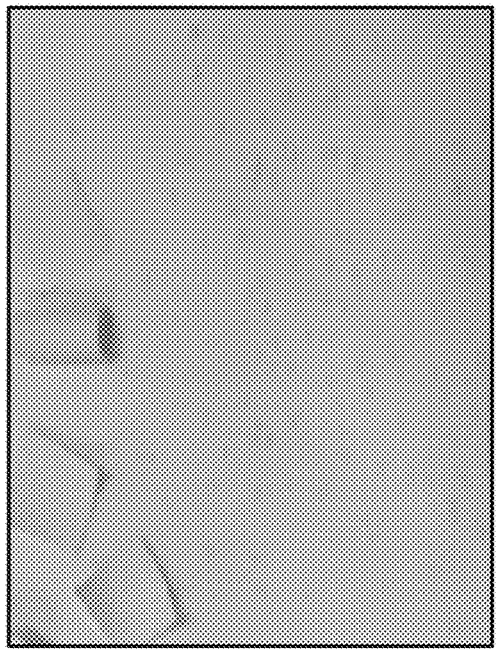
FIGS. 3a, 3b and 3c, shows photographs of casted tapes.
Figure 3C:
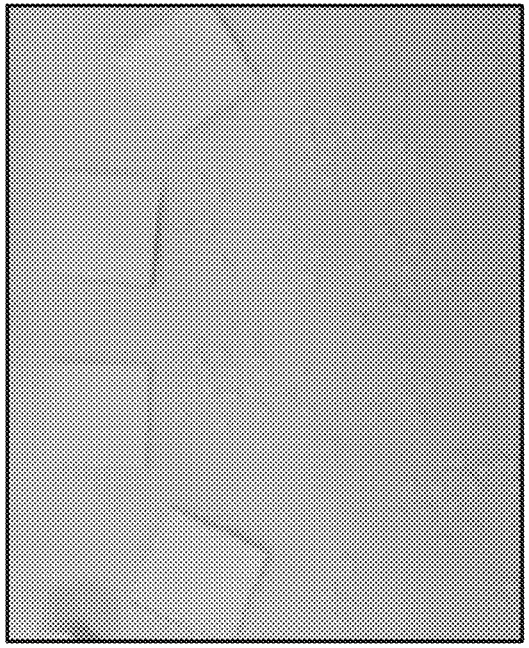
Figure 3A:
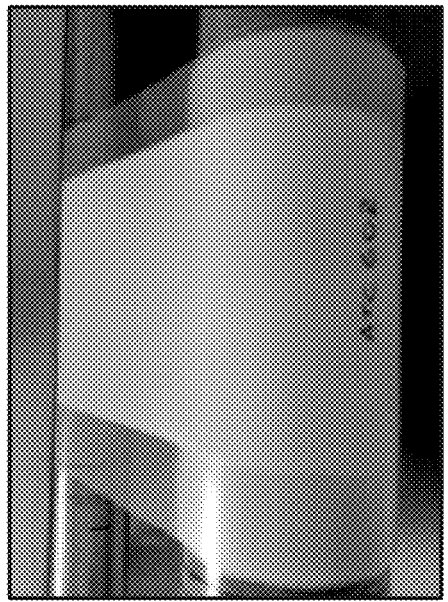

The slurry rheology of the phosphor P is difficult to control but still able to be tape cast even if the standard binder level is too high for the large grains, and the colloidal dispersion is difficult. The sample PM2 worked better for tape-casting. The pure phosphor samples P1, especially in a size of ~25 mm×25 mm and thickness of ~120 μm often warped, which is attributed to particle settling during the casting process, but the samples PM1 and PM2 show a lower warpage. The tape-cast samples P1 and PM2 are shown in FIG. 3a (P1), 3b (P1) and 3c (PM2) by photographs.

Figure 4:
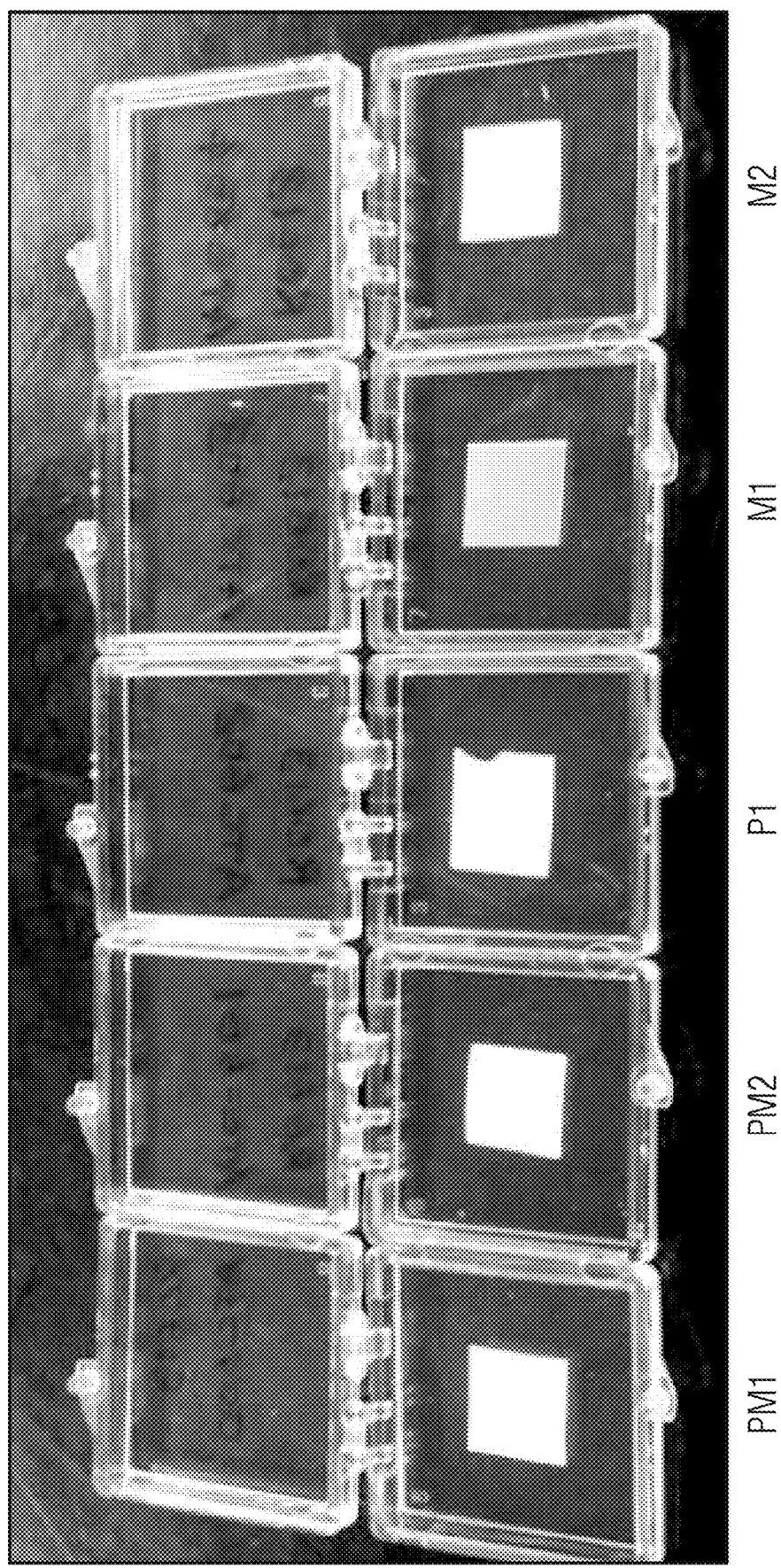
FIG. 4 shows photographs of sintered platelets.

FIG. 4 shows a photograph of sintered parts of the samples PM1, PM2, P1, M1 and M2. It can be seen that the YAG samples PM1 and M1 exhibit a higher transparency than the $Al_2O_3$ samples PM2 and M2 respectively.

Figure 5A:
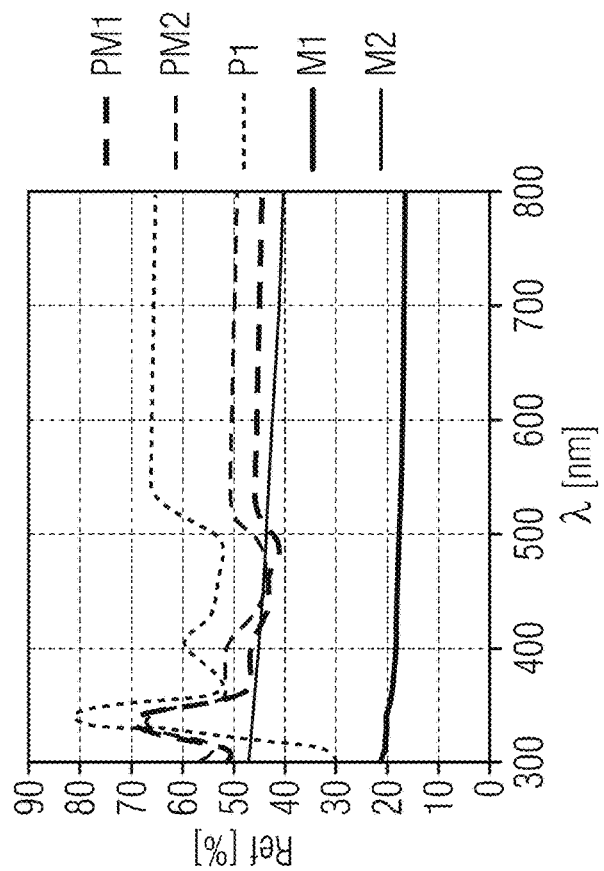
FIGS. 5a and 5b, shows transmission and reflection values.
Figure 5B:
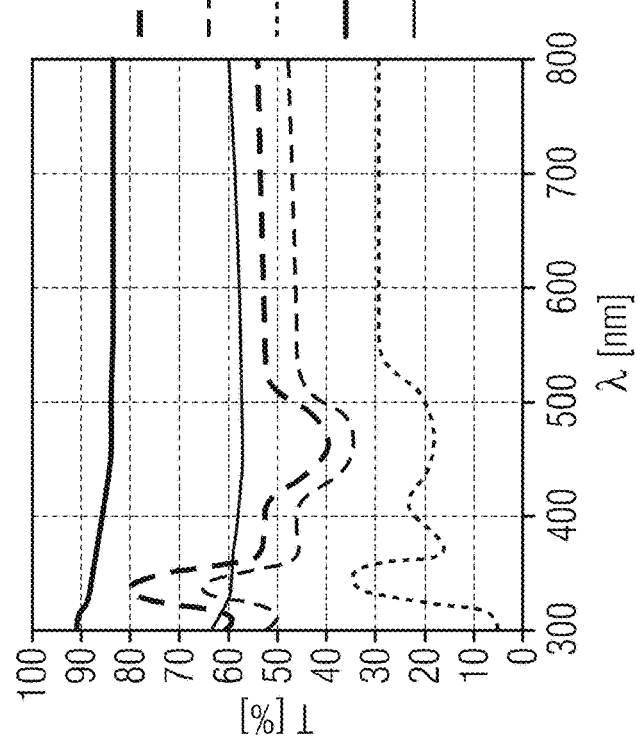

FIG. 5a shows the transmission values T (%) in dependence of the wavelength λ (nm) of sintered samples PM1, PM2, P1, M1 and M2, FIG. 5b shows the reflection values Ref (%) in dependence of the wavelength λ (nm) of the same samples in wavelength ranges of 300 to 800 nm.

Table 3 summarizes the values for absorption ABS and transmission T of samples P, P1, PM1, PM2, M1 and M2, all of them being sintered at 1720° C., and reference samples R1 (a second phase sample produced by conventional second phase approach i.e. mixed oxide process with extra $Al_2O_3$ for matrix) and R2 (single phase sample as explained in context with Table 2), QE and absorption measured by laser-sphere.

TABLE 3

| Description | ABS (%) | QE(%) | % T (700 nm) |
|---|---|---|---|
| P | 53 | 99 | — |
| P1 | 81 | 88 | 29% |
| PM1 | 70 | 98 | 54% |
| PM2 | 71 | 92 | 48% |
| M1 | 5 | 38 | 84% |
| M2 | 5 | 2 | 60% |
| Reference 1 (second phase sample) | 59 | 90 | 75% |
| Reference 2 (single phase sample) | 50 | 91 | 84% |

Figure 6D:
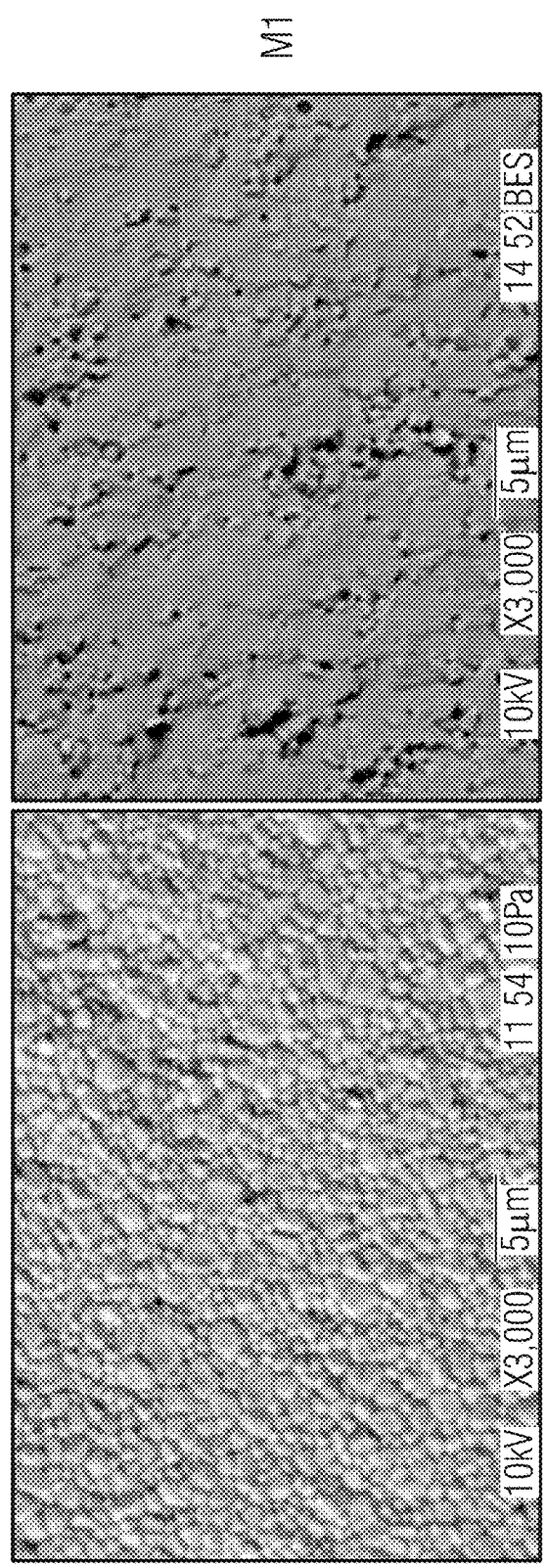
Figure 6E:
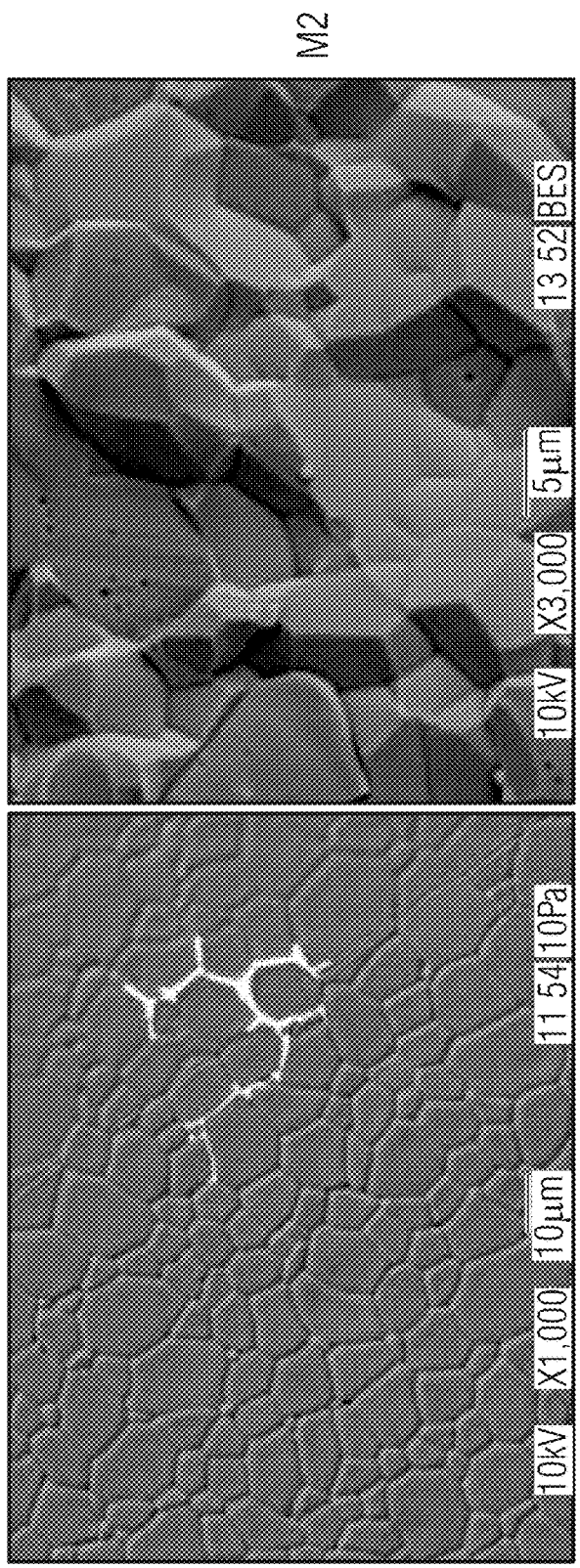

FIGS. 6a to 6e show SEM images of the microstructures of the samples PM1 (FIG. 6a), PM2 (FIG. 6b), P1 (FIG. 6c), M1 (FIG. 6d), and M2 (FIG. 6e), all of them being sintered at 1720° C. In FIG. 6a a beginning of exaggerated grain growth (EGG) with some $BaAl_2O_4$ phases can be observed. Also in the sample PM2 large grains of alumina with pores in grains and $BaAl_2O_4$ can be observed at the surface (FIG. 6b, left) and in the fracture (FIG. 6b, right). The sample P1 is poorly sintered and has a large grain size with $BaAl_2O_4$ and $CeO_2$ phases on its surface (FIG. 6c, right) and throughout the bulk (fracture in FIG. 6c, left). The matrix M1 has a smaller grain size, as can be seen in FIG. 6d, and the matrix M2 shown in FIG. 6e has an exaggerated grain growth and pores inside the grains.

FIGS. 7a and 7b show spectra (FIG. 7a shows the intensity I (mw/nm) in dependence of the wavelength λ (nm) and FIG. 7b shows the normalized intensity $I_{norm}$ in dependence of the wavelength λ (nm)) of the matrix M1, M2, the samples PM1, PM2 and the phosphor P1 and P in comparison to a blue LED. The measurements were performed with a 1 mm×1 mm×0.1 mm ceramic phosphor element on an LED in sphere. It can be seen that the intensity of PM1 is higher than the intensity of PM2 which higher than the intensity of P1. P1 shows a very low blue transmission and some Ce contamination can be observed in the pure matrix M1. Further a fairly high blue transmission can be seen in sample M1, a slightly less blue transmission in sample M2. No spectral shift can be recognized in comparison to the blue LED. Further the red shift being a Ce re-absorption is greatest in sample P1 having a high scattering due to a poor sintering as can be seen in FIG. 7b.

It could be shown that the sample P, thus the YAG:Ce powder, has a very high QE of 99% being measured in laser sphere (Lab 30). But the ceramic made with P alone did not maintain its high QE value but showed a reduced value of 88%, possibly due to the poor sintering behavior and/or the appearance of $BaAl_2O_4$ and $CeO_2$ phases. The sample PM1 shows high QE of 98% and high lumens on an LED. Sample PM2 had a QE of 92% and decreased lumens, but still a higher QE than conventional YAG:Ce in $Al_2O_3$ through oxide approach, i.e., YAG:Ce phosphor formed from mixture of $Y_2O_3$, $Al_2O_3$, $CeO_2$ etc. and standard products single phase ceramic converter (90% and 91%). The transmission of M1 is higher than in M2 and thus the sample PM1 shows a higher transmission than the sample PM2. The undoped YAG ceramic M1 exhibited weak emission being attributed to a Ce contamination from the slurry processing or from the sintering furnace.

In the following the effect of atmosphere on the sintering of the materials is examined. The phosphor here is a YAG phosphor doped with Ce (~3%) with a high QE and a d50 of about 7 μm with agglomerates and designated P2. The matrix is a YAG matrix and the phosphor has a content in the matrix of 7.2 vol %. The sintering takes place in two atmospheres. The standard being 5 lpm (liter per minute) wet $H_2$ (0° C. dew point). The thus sintered samples are designated as P2M1-H2. The other atmosphere is an 8 lpm $N_2$, with <0.3 lpm wet $H_2$ (0° C. dew point) with an amount of about 1.5 to 3% $H_2$. These samples are designated as P2M1-N2-H2.

Figure 8A:
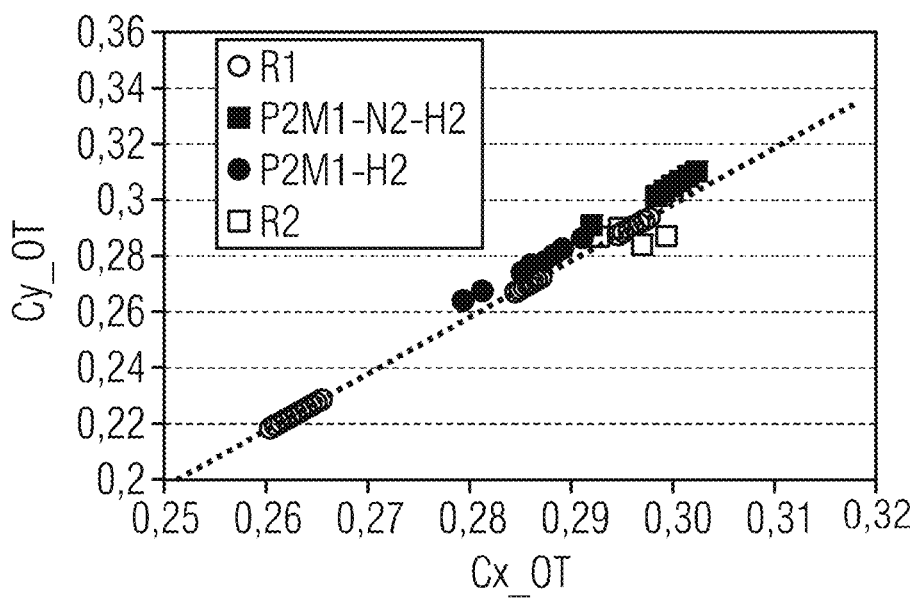
FIGS. 8a and 8b, shows conversion lines of sintered materials.
Figure 8B:
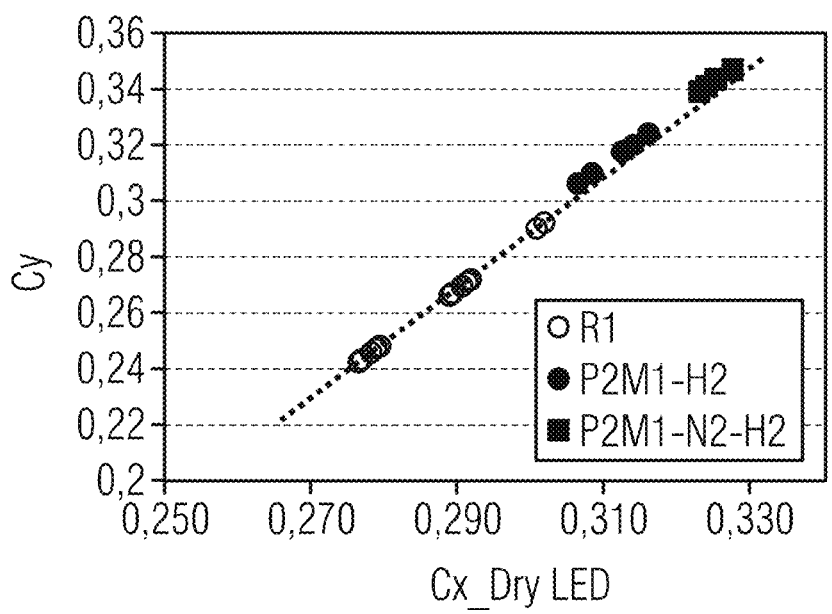

FIG. 8 show conversion lines (the coordinate Cy in dependence of coordinate Cx) of reference samples R1, R2 and the samples P2M1-N2-H2 and P2M1-H2. FIG. 8a shows the results of the measurement on OT, an in-house designed pin-hole sphere-measurement system, FIG. 8b shows the results of the measurement on dry LED—an in-house designed system but with ceramic converter placed on LED chip in a sphere system. The sintered platelets have conversion lines close to the Reference examples with slight green shifts.

FIG. 9 shows that the samples P2M1-H2 and P2M1-N2-H2 have a higher LPWo-b, which is defined and calculated using lumens of emission spectra divided by the blue chip optical power (Wo-b), than reference sample R1 at similar color points Cx.

FIG. 10 shows spectra recorded on LEDs (without glue) in sphere. The samples P2M1-H2 and P2M1-N2-H2 are measured and their intensity I in dependence of the wavelength λ (nm) is compared to a photopic curve (PC), being the CIE standard curve used in the CIE 1931 color space. The luminous flux (or power) a light source is defined by the photopic luminosity function. It can be shown that there is only a minor shift of spectra for the samples sintered in N2-H2 vs H2. The photopic curve provides a reference only.

The data analysis of samples P2M1-H2 and P2M1-N2-H2 shows that the CQE of the P2M1-N2-H2 is 1% higher than Reference example R2 and 0.7% higher than in the sample P2M1-H2.

Figure 11:
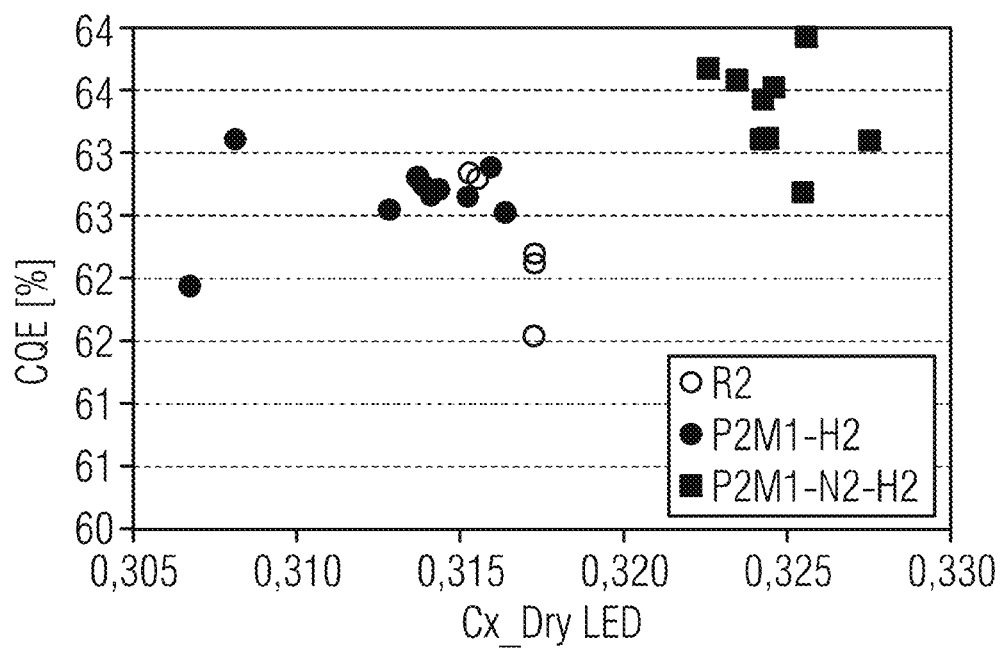
FIG. 11 shows the CQE of exemplary embodiments and reference examples.

This is also shown in FIG. 11 where the CQE in dependence of Cx is the highest for sample P2M1-N2-H2 being 1% higher than Reference example R2 and the CQE is higher for forming gas than for a standard wet hydrogen sintering.

Generally it can be shown that CQE is statistically higher for forming gas than in wet hydrogen alone and also for materials having a YAG matrix than Reference example R2.

Figure 12A:
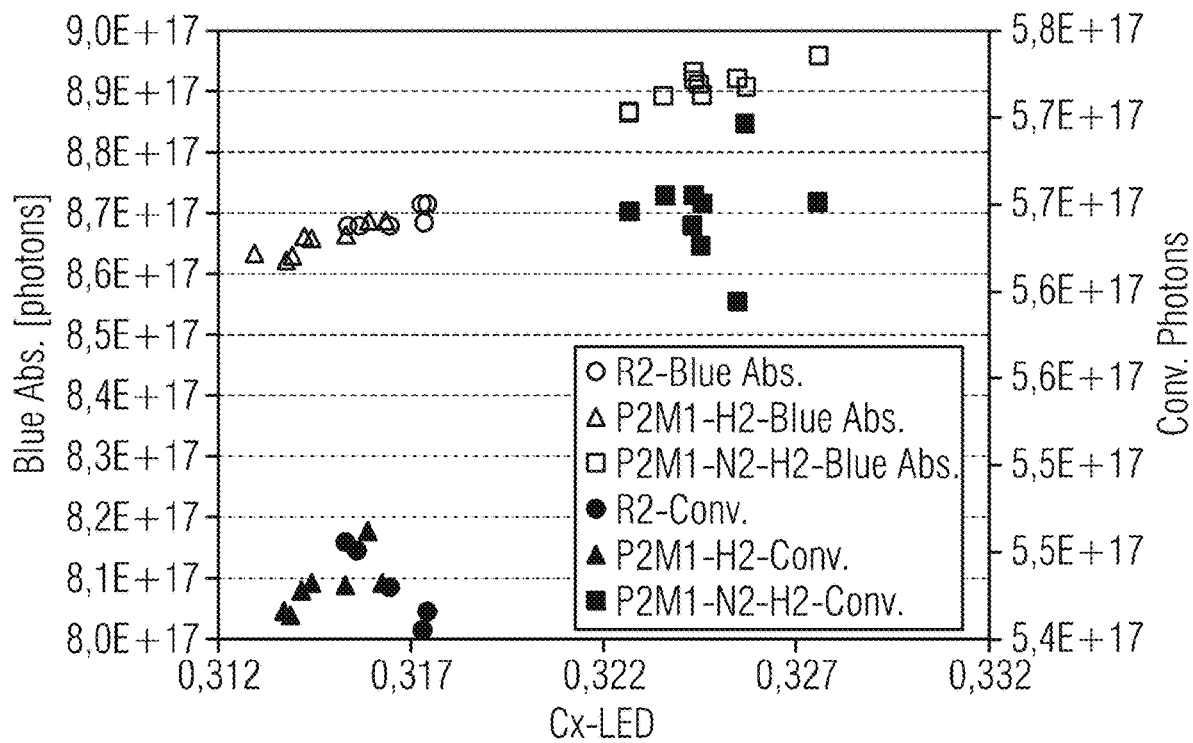
FIGS. 12a and 12b, shows absorption and conversion photon measurements of exemplary embodiments and reference examples.
Figure 12B:
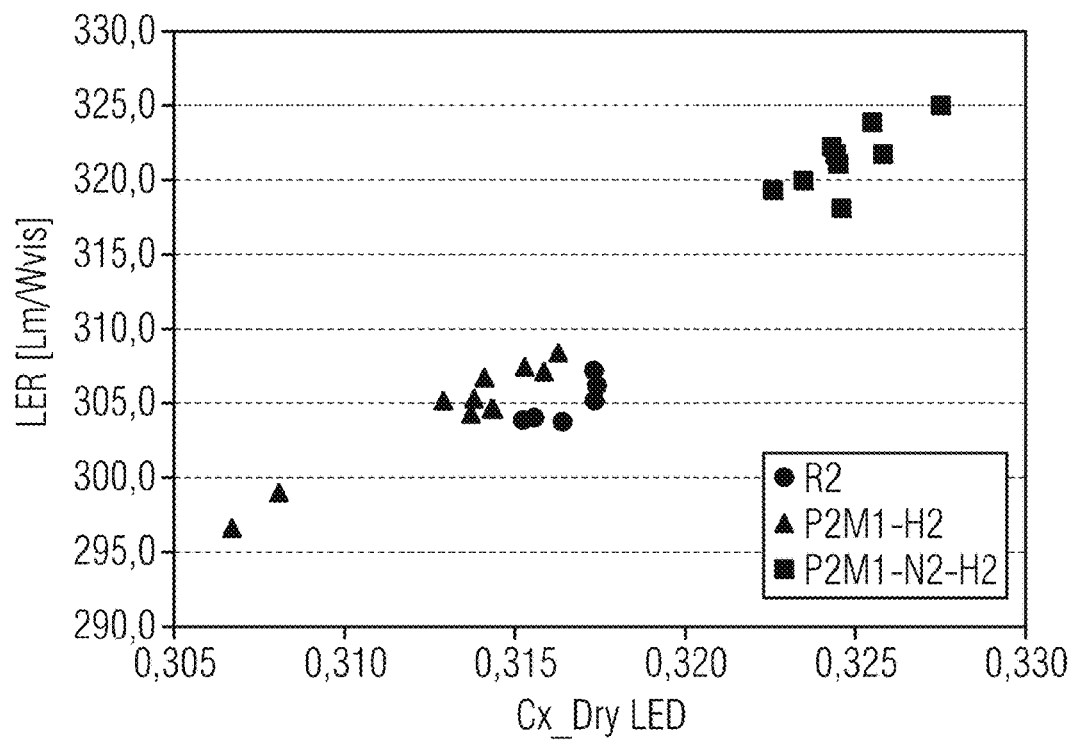

FIG. 12 shows measurements of the blue absorption (blue abs) and the conversion photons (cony) in dependence of Cx of different samples sintered in H2 and in N2-H2 as well as of reference sample R2 (FIG. 12a). It can be shown that the luminous efficacy of radiation (LER) increases linearly with Cx due to higher emission to blue transmission ratio (FIG. 12b). The matrix materials sintered in N2-H2 show more blue absorption and more conversion photons leading to a lower percentage of pump-through and higher percentage of conversion. The higher CQE being observed is not caused by a color shift.

The scope of protection of the invention is not limited to the examples given hereinabove. The invention is embodied in each novel characteristic and each combination of characteristics, which particularly includes every combination of any features which are stated in the claims, even if this feature or this combination of features is not explicitly stated in the claims or in the examples.

What is claimed is:

1. A method for producing a ceramic converter element, the method comprising:
   providing a phosphor as a starting material, the phosphor comprising a doped garnet;
   mixing the phosphor and at least one metal oxide powder to form a mixture; and
   processing the mixture to form a ceramic converter material in which the phosphor is embedded in a ceramic matrix material,
   wherein the doped garnet comprises $Y_3Al_5O_{12}$:Ln and the metal oxide powder comprises $Y_3Al_5O_{12}$ or $Y_3Al_5O_{12}$ and $Al_2O_3$, or
   wherein the doped garnet comprises $Lu_3Al_5O_{12}$:Ln and the metal oxide powder comprises $Lu_3Al_5O_{12}$ or $Lu_3Al_5O_{12}$ and $Al_2O_3$, and
   wherein Ln is chosen from at least one of Ce, Gd, Pr or Eu.

2. The method according to claim 1, wherein the phosphor and the metal oxide powder are free of second phases and/or impurities.

3. The method according to claim 1, wherein the phosphor comprises Ce and/or Gd.

4. The method according to claim 1, wherein the phosphor comprises a quantum efficiency (QE) of at least 90%.

5. The method according to claim 1, wherein the mixing comprises milling.

6. The method according to claim 1, wherein the processing comprises adding at least one additive to the mixture to form a slurry, tape casting the slurry to form a green part, prefiring and/or debinding and sintering the green part to form the ceramic converter material.

7. The method according to claim 6, wherein the sintering is performed in a wet or dry hydrogen atmosphere or in a dry or wet hydrogen-nitrogen atmosphere.

8. The method according to claim 6, wherein the at least one additive is chosen from the group consisting of water, binders, de-foamers, dispersants, plasticizers, and mixtures thereof.

9. The ceramic converter element produced using the method according to claim 1.

10. An optoelectronic component comprising:
    an active layer sequence configured to emit electromagnetic radiation of a primary wavelength; and
    the ceramic converter element produced with the method according to claim 1, the ceramic converter element being located in a beam path of the active layer sequence and configured to convert the primary wavelength at least partly into a secondary wavelength, wherein the ceramic converter element comprises a quantum efficiency (QE) of at least 90%.

11. A method for producing a ceramic converter element, the method comprising:
    providing a phosphor as a starting material, the phosphor comprising a doped garnet;
    mixing the phosphor and at least one metal oxide powder to form a mixture; and
    processing the mixture to form a ceramic converter material in which the phosphor is embedded in a ceramic matrix material,
    wherein the doped garnet comprises $Y_3Al_5O_{12}$:Ln and the metal oxide powder comprises $Y_3Al_5O_{12}$ or $Y_3Al_5O_{12}$ and $Al_2O_3$, or
    wherein the doped garnet comprises $Lu_3Al_5O_{12}$:Ln and the metal oxide powder comprises $Lu_3Al_5O_{12}$ or $Lu_3Al_5O_{12}$ and $Al_2O_3$,
    wherein the phosphor is a pre-synthesized phosphor with a cubic crystal phase with no second phases, and
    wherein Ln is chosen from at least one of Ce, Gd, Pr or Eu.

12. The method according to claim 11, wherein the phosphor comprises a dopant that comprises a lanthanide.

13. The method according to claim 12, wherein the phosphor comprises Ce and/or Gd.

14. The method according to claim 11, wherein the phosphor comprises a quantum efficiency (QE) of at least 90%.

15. A method for producing a ceramic converter element, the method comprising:
    providing a phosphor as a starting material, the phosphor comprising a doped garnet;
    mixing the phosphor and at least one metal oxide powder to form a mixture; and
    processing the mixture to form a ceramic converter material in which the phosphor is embedded in a ceramic matrix material, and
    wherein the doped garnet comprises $Y_3Al_5O_{12}$:Ln and the metal oxide powder comprises $Y_3Al_5O_{12}$ or $Y_3Al_5O_{12}$ and $Al_2O_3$, or
    wherein the doped garnet comprises $Lu_3Al_5O_{12}$:Ln and the metal oxide powder comprises $Lu_3Al_5O_{12}$ or $Lu_3Al_5O_{12}$ and $Al_2O_3$,
    wherein Ln is selected from at least one of Ce, Gd, Pr, and Eu, and
    wherein processing comprises:
      adding at least one additive to the mixture to form a slurry,
      tape casting the slurry to form a green part, and
      prefiring and/or debinding and sintering the green part to form the ceramic converter material.

16. The method according to claim 15, wherein the phosphor and the metal oxide powder are free of second phases and/or impurities.

17. The method according to claim 15, wherein the phosphor comprises Ce and/or Gd.

18. The method according to claim 15, wherein the phosphor comprises a grain size d50 where 0.5 µm≤d50≤40 µm and d90≤45 µm, and wherein the metal oxide comprises a grain size d50 where 0.1 µm≤d50≤10 µm and d90≤15 µm.

* * * * *